(12) United States Patent
Uchikawa

(10) Patent No.: US 6,385,186 B1
(45) Date of Patent: May 7, 2002

(54) DOWN-TRAFFIC-SIGNAL TRANSMISSION SYSTEM

(75) Inventor: Kiyoshi Uchikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/106,253

(22) Filed: Jun. 29, 1998

(30) Foreign Application Priority Data

Jun. 30, 1997 (JP) .............................................. 9-174041

(51) Int. Cl.[7] .............................................. H04B 7/216
(52) U.S. Cl. ...................................... 370/342; 370/335
(58) Field of Search ................................ 370/313, 320, 370/328, 331, 332, 333, 334, 335, 342, 441; 455/436, 442, 560, 561

(56) References Cited

U.S. PATENT DOCUMENTS

| 5,652,748 A | * | 7/1997 | Jolma et al. ................. 370/320 |
| 5,931,964 A | * | 8/1999 | Beming et al. .............. 714/748 |
| 6,151,512 A | * | 11/2000 | Chheda et al. ............... 455/562 |

FOREIGN PATENT DOCUMENTS

WO        WO95/08901        3/1995

\* cited by examiner

*Primary Examiner*—Chau Nguyen
*Assistant Examiner*—Ronald Abelson
(74) *Attorney, Agent, or Firm*—Whitham, Curtis & Christofferson P.C.

(57) ABSTRACT

There is disclosed a down-traffic-signal transmission system for a mobile communication system in which communication between the base stations and the mobile station is performed in accordance with the CDMA scheme. A spread-coding apparatus provided in the base station comprises a valid signal determination unit for determining, as valid information, a control signal and/or a voice signal contained in a received traffic signal when correctly received, and determining, as invalid information, the control signal and/or the voice signal when incorrectly received; a selection instruction unit for outputting a timing signal based on results of the determination of the valid signal determination unit, the timing signal indicating that the control signal is valid or invalid information and that the voice signal is valid or invalid information; a selection unit which, in-accordance with the timing signal, assigns to the control signal and/or the voice signal determined as valid information a spread code that can be demodulated in the mobile station, and assigns to the control signal and/or the voice signal determined as invalid information a spread code that cannot be demodulated in the mobile station; and a modulator for modulating the control signal and the voice signal through use of the spread code assigned by the selection unit.

2 Claims, 8 Drawing Sheets

FIG. 5

CONTROL SIGNAL

| S |

VOICE SIGNAL

| V |

INPUT SIGNAL

| S | V | S | V | V | V |

DOWN-TRAFFIC-SIGNAL TRANSMISSION SYSTEM

BACKGROUND OF THE INVENTION

1. Field of the Invention

The present invention relates to a down-traffic-signal transmission system for a mobile communication system in which communication between base stations and mobile stations is performed in accordance with the CDMA (Code Division Multiple Access) scheme.

2. Description of the Related Art

In a mobile communication system in which communication between base stations and mobile stations is performed in accordance with the CDMA scheme, when routing is switched from one base station to another base station in accordance with movement of a mobile station, such switching must be performed instantaneously such that a user does not notice it. Therefore, during switchover of base stations, a mobile station communicates with two or more base stations simultaneously (this technique will be called "soft handoff" hereinafter). At this time, the mobile station performs maximum ratio composition in which energies of signals received from the respective base stations are added together.

In the CDMA scheme, in order to allow a mobile station to communicate with a plurality of base stations simultaneously, each of the base stations modulates a signal through use of a different spread code, and the mobile station demodulates the signal through use of the same spread code as that used in the corresponding base station. Thus, the mobile station can extract the signal transmitted from each base station.

For example, International Patent Publication No. WO 95/08901 discloses a technique in which signals are modulated at respective base stations through use of different spread codes; the signals modulated through use of different spread codes are respectively received by means of independent reception units provided in a mobile unit; and demodulated signals output from the reception units are combined.

With reference to FIG. 6, a description will be given of such a conventional mobile communication system, particularly of a system for transmitting a down traffic signal from a base station to a mobile station.

FIGS. 6(a) and 6(b) show the structure of a conventional down-traffic-signal transmission system, wherein FIG. 6(a) is a block diagram of the down-traffic-signal transmission system, and FIG. 6(b) is a block diagram showing the structure of a spread-coding apparatus provided in a base station.

In FIG. 6(a), numeral 51 denotes a base station controller 51 which establishes connection between a mobile communication exchange and base stations and controls the base stations. First and second base stations 52 and 53 are connected to the base station controller 51 via respective lines. A mobile station 54 communicates with the first and second base stations 52 and 53 via respective radio means. although FIG. 6(a) shows an example in which the mobile station 54 communicates with two base stations (the first and second base stations 52 and 53), three or more base stations may be installed.

As shown in FIG. 6(b), each of the first and second base stations 52 and 53 has a spread-coding apparatus 60 which performs modulation through use of a spread code. The spread-coding apparatus 60 includes a modulator 64. The spread-coding apparatus 60 of the first base station 52 performs modulation through use of a spread code $C_1$, and the spread-coding apparatus 60 of the second base station 53 performs modulation through use of a spread code $C_2$.

In the first and second base stations 52 and 53 there are composed a voice signal and a control signal (e.g., a signal for identifying a base station under communication)—which are separately transmitted from the base station controller 51—and a thus-obtained composite signal is input to the spread-coding apparatus 60 as a traffic signal (input signal). An output signal from the spread-coding apparatus 60 is transmitted to the mobile station 54 as a down traffic signal.

The down traffic signal is not necessarily composed of both a voice signal and a control signal and in some cases may be composed of only a voice signal or a control signal. Further, the mobile station 54 includes reception units that can demodulate signals modulated through use of the spread codes $C_1$ and $C_2$.

However, in the above-described conventional down-traffic-signal transmission system, when a fault occurs in communication between the base station controller and the base stations, the base stations may send different down traffic signals to the mobile station.

For example, if the first base station correctly receives a voice signal and a control signal and the second base station correctly receives only the voice signal at a timing where both the voice signal and the control signal have to be received by the first and second base stations, the mobile station receives different signals from the first and second base stations. In such a case, the mobile station cannot compose them, and therefore cannot reproduce a signal.

In order to solve such a problem, the down-traffic-signal transmission system may be modified such that a base station that has correctly received only a voice signal or a control signal does not transmit a down traffic signal to the mobile station. However, in this case, the voice signal or the control signal that is correctly received is not used in the mobile station. Further, if the first base station correctly receives only the control signal and the second base station correctly receives only the voice signal, no down traffic signal is transmitted to the mobile station.

SUMMARY OF THE INVENTION

The present invention has been accomplished to solve the above-described problems involved in the prior art techniques, and an object of the present invention is to provide a down-traffic-signal transmission system that allows a mobile station to effectively use a correctly received signal even when a base station correctly receives only one of a voice signal and a control signal transmitted from a base station controller.

Another object of the present invention is to provide a down-traffic-signal transmission system that can prevent a signal that is not correctly received by the base station from being received by a mobile station as noise that has a strong correlation with a correctly received signal and therefore makes reproduction of the signal impossible.

To achieve the foregoing objects, the present invention provides an improved down-traffic-signal transmission system for a mobile communication system comprising:

a plurality of base stations;

a mobile station capable of being connected with at least one base station via radio means; and a base station controller provided for connecting a mobile communication exchange and the base stations and for controlling the base stations;

wherein communication between the base stations and the mobile station is performed in accordance with the CDMA scheme.

The down-traffic-signal transmission system is designed such that each of the base stations has a spread-coding apparatus for modulating, through use of a different spread code, a traffic signal obtained through composition of a voice signal and a control signal separately received from the base station controller; and the thus-modulated traffic signal is transmitted from the base station to the mobile station.

The spread-coding apparatus comprises:

a valid signal determination unit for determining, as valid information, a control signal and/or a voice signal contained in a traffic signal from the base station controller when correctly received, and determining, as BE invalid information, the control signal and/or the voice signal when incorrectly received;

a selection instruction unit for outputting a timing signal based on results of the determination of the valid signal determination unit, the timing signal indicating that the control signal is valid or invalid information and that the voice signal is valid or invalid information;

a selection unit which, in accordance with the timing signal, assigns to the control signal and/or the voice signal determined as valid information a spread code that can be demodulated in the mobile station, and assigns to the control signal and/or the voice signal determined as invalid information a spread code that cannot be demodulated in the mobile station; and a modulator for modulating the control signal and the voice signal through use of the spread code assigned by means of the selection unit.

The spread-coding apparatus may have a division pattern recognition unit for recognizing the format pattern of the traffic signal formed by the control signal and the voice signal, and the selection instruction unit may operate to output a timing signal based on the result of determination of the valid signal determination unit in accordance with the format pattern that the division pattern recognition unit has recognized.

In the down-traffic-signal transmission system having the above-described structure, in accordance with the timing signal, the selection unit assigns to the control signal and/or the voice signal determined as valid information a spread code that can be demodulated in the mobile station and assigns to the control signal and/or the voice signal determined as invalid information a spread code that cannot be demodulated in the mobile station.

Accordingly, when a mobile station communicates with a plurality of base stations during, for example, soft handoff, the mobile station demodulates control signals and voice signals correctly received at the base stations among the signals transmitted from the base station controller to the base stations.

At this time, a control signal and/or a voice signal that has not been correctly received at a base station is modulated through use of a spread code that has no correlation with a spread code that can be demodulated at the mobile station. Therefore, the incorrectly received signal or signals do not serve as noise having a strong correlation with a correctly received signal.

The present invention has the following advantageous effects:

Even when a base station correctly receives only one of a voice signal and a control signal transmitted from the base station controller during soft handoff, the mobile station utilizes signals that are correctly received at the respective base stations in order to reproduce a signal through maximum ratio composition.

Further, since a signal that is not correctly received at the base station is not received by the mobile station as noise having a strong correlation with a correctly received signal, the reproduction of a signal is not prevented by the noise.

In the case where the spread-coding apparatus has a division pattern recognition unit, and the selection instruction unit operates to output a timing signal in accordance with the format pattern that the division pattern recognition unit has recognized, even when the amount of a control signal completely differs from that of a voice signal, both the signals can be effectively used at the mobile station. Especially, even when the down traffic signal is composed of only a voice signal or a control signal, these signals can be effectively used at the mobile station.

BRIEF DESCRIPTION OF THE DRAWINGS

FIGS. 1(a) and 1(b) show the structure of a first embodiment of a down-traffic-signal transmission system according to the present invention, wherein FIG. 1(a) is a block diagram of the down-traffic-signal transmission system, and FIG. 1(b) is a block diagram showing the structure of a spread-coding apparatus provided in a base station;

FIG. 5 a diagram showing a pattern of an input signal input to the spread-coding apparatus shown in FIG. 4; and FIGS. 6(a) and 6(b) show the structure of a conventional down-traffic-signal transmission system, wherein FIG. 6(a) is a block diagram of the down-traffic-signal transmission system, and FIG. 6(b) is a block diagram showing the structure of a spread-coding apparatus provided in a base station.

DESCRIPTION OF PREFERRED EMBODIMENTS

Embodiments of the present invention will now be described with reference to the drawings.

First Embodiment

Figure 1:
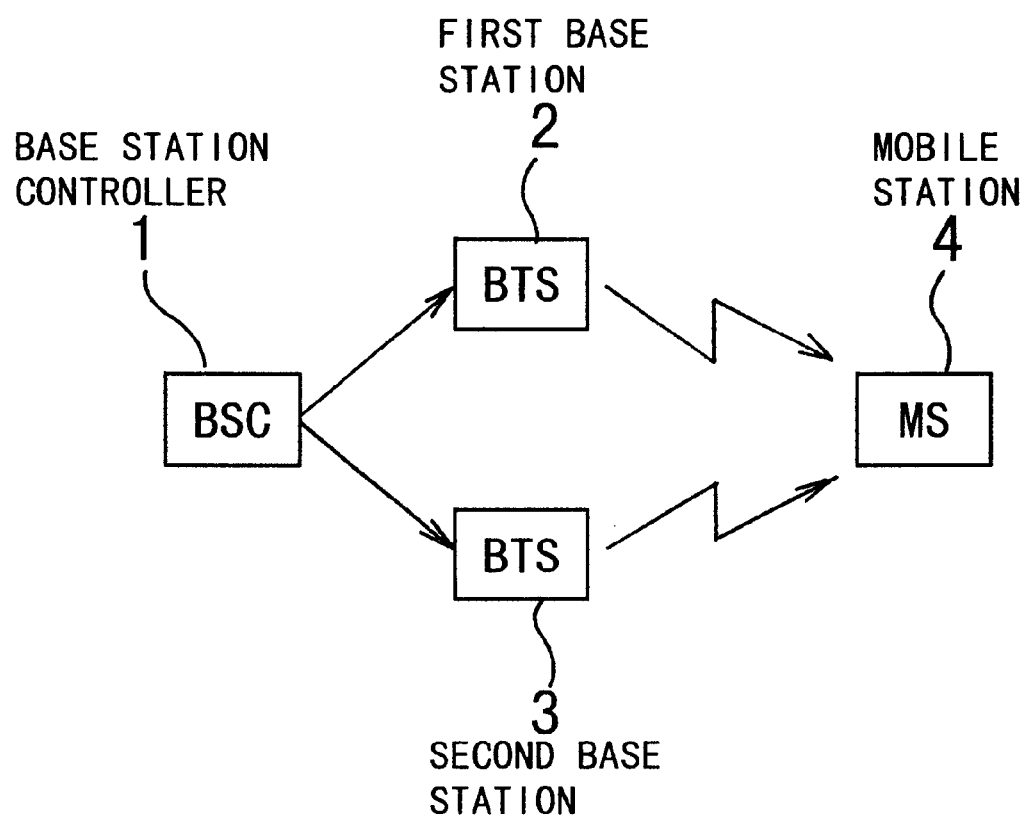
Figure 1B:
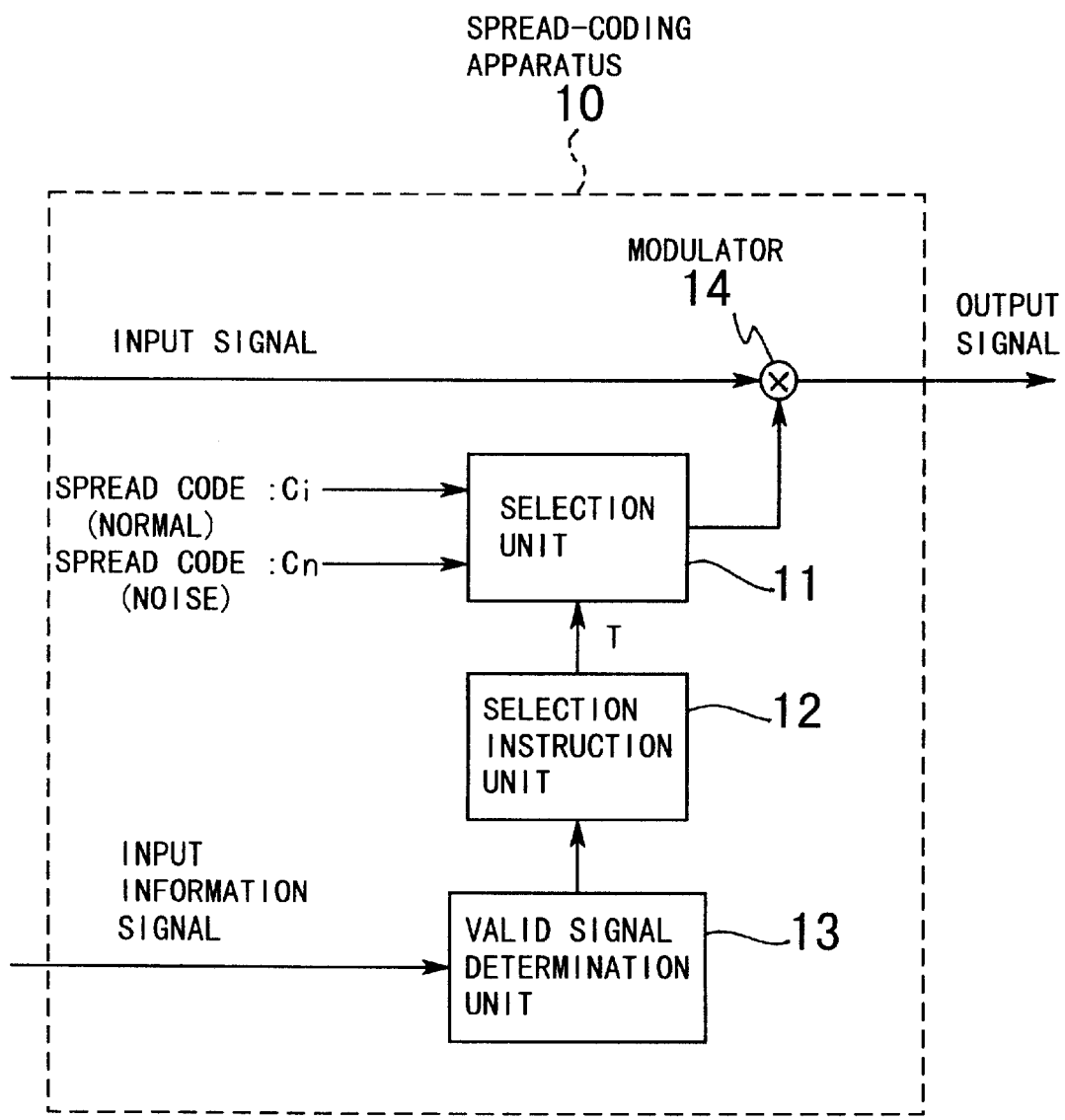
Figure 2:
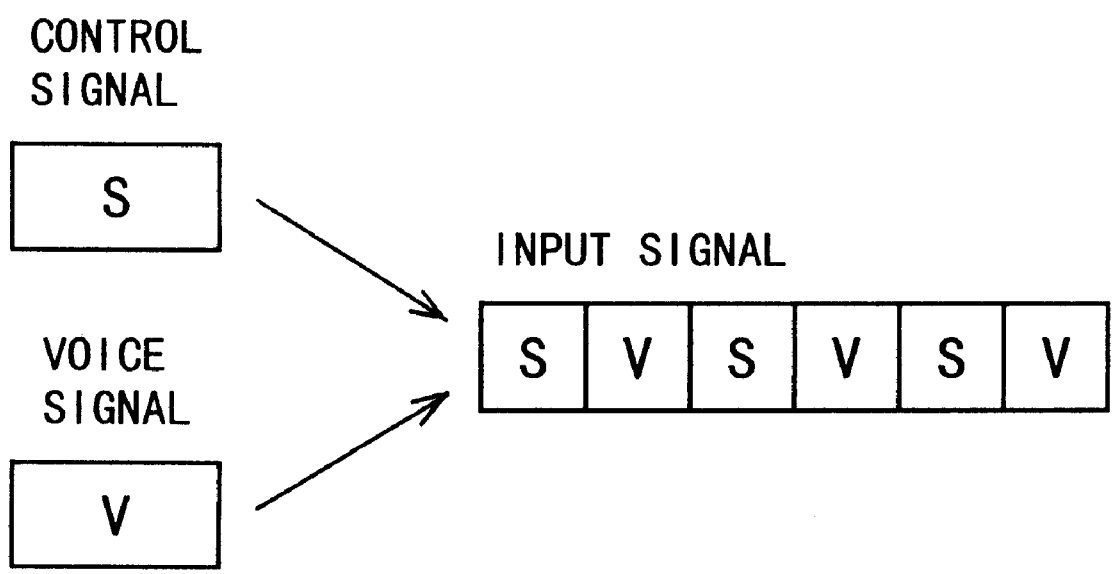
FIG. 2 is a diagram showing a pattern of an input signal input to the spread-coding apparatus shown in FIG. 1(b)
Figure 3:
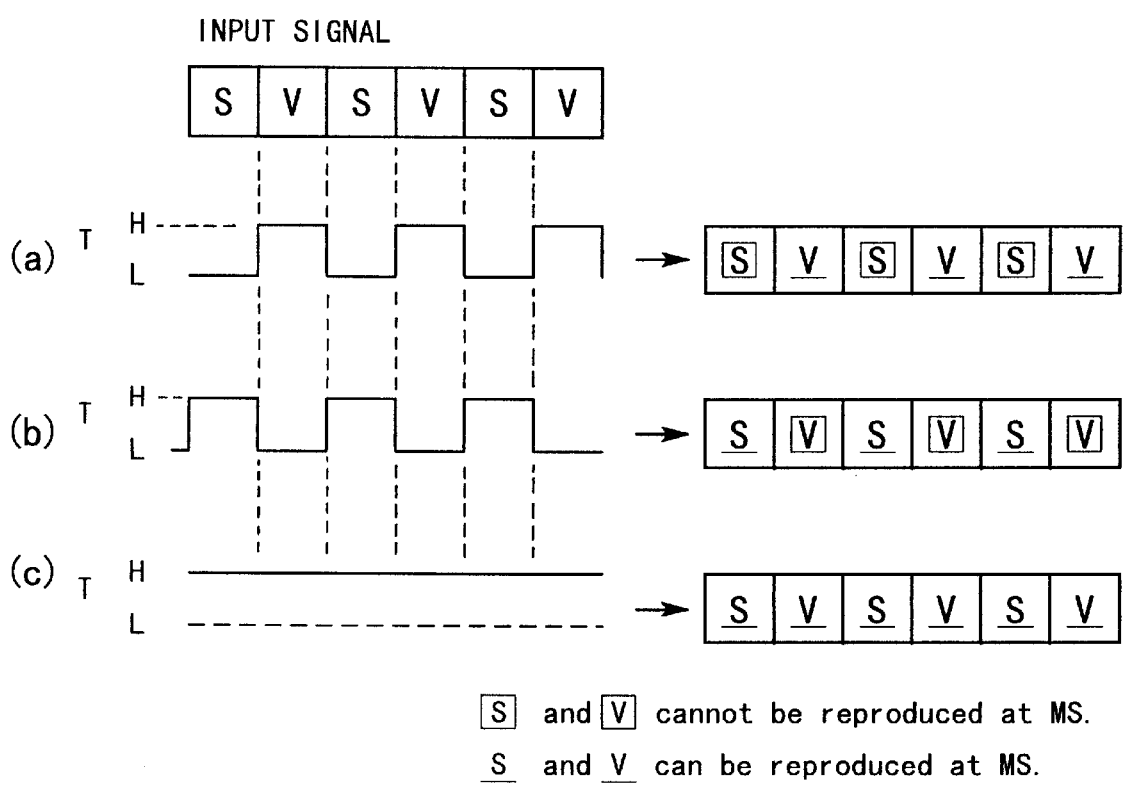
FIG. 3 is a diagram showing the operation of the spread-coding apparatus responding to the input signals shown in FIG. 2.

FIGS. 1(a) and 1(b) show the structure of a first embodiment of a down-traffic-signal transmission system according to the present invention, wherein FIG. 1(a) is a block diagram of the down-traffic-signal transmission system, and FIG. 1(b) is a block diagram showing the structure of a spread-coding apparatus provided in a base station; FIG. 2 is a diagram showing a pattern of an input signal input to the spread-coding apparatus shown in FIG. 1(b); and FIG. 3 is a diagram showing the operation of the spread-coding apparatus responding to the input signals shown in FIG. 2.

In FIG. 1(a), numeral 1 denotes a base station controller which establishes connection between a mobile communication exchange and base stations and controls the base stations. First and second base stations 2 and 3 are connected to the base station controller 1 via respective lines. A mobile station 4 communicates with the first and second base stations 2 and 3 via respective radio means. Although FIG. 1(*a*) shows an example in which the mobile station 4 communicates with two base stations, three or more base stations may be-installed.

As shown in FIG. 1(*b*), each of the first and second base stations 2 and 3 has a spread-coding apparatus 10. The spread-coding apparatus 10 includes a valid signal determination unit 13, a selection instruction unit 12, a selection unit 11, and a modulator 14. The valid signal determination unit 13 determines, as valid information, a control signal and/or a voice signal contained in a traffic signal from the base station controller 1 when correctly received, and determines, as invalid information, the control signal and/or the voice signal when incorrectly received. The selection instruction unit 12 outputs a timing signal T based on results of the determination of the valid signal determination unit 13. The timing signal indicates that the control signal is valid or invalid information and that the voice signal is valid or invalid information. In accordance with the timing signal T, the selection unit 11 assigns to the control signal and/or the voice signal determined as valid information a spread code Ci that can be demodulated in the mobile station 4 and assigns to the control signal and/or the voice signal determined as invalid information a spread code Cn that cannot be demodulated in the mobile station 4. The modulator 14 modulates the control signal and the voice signal through use of the spread code assigned by means of the selection unit 11.

In the first and second base stations 2 and 3, a voice signal and a control signal which are separately transmitted from the base station controller 1 are composed and a thus-obtained composite signal is input to the spread-coding apparatus 10 as a traffic signal (input signal). An output signal from the spread-coding apparatus 10 is transmitted to the mobile station 4 as a down traffic signal.

The operation of the down-traffic-signal transmission system shown in FIGS. 1(*a*) and 1(*b*) having the above-described structure will be described with reference to FIGS. 2 and 3. In the present embodiment, a description will be given of the case where one mobile station communicates with two base stations (the first and second base stations 2 and 3). However, the operation is the same in the case where one mobile station communicates with three or more base stations.

Also, the following description is based on the assumption that among signals transmitted from the base station controller 1, the first base station 2 has correctly received a voice signal and a control signal, while the second base station 3 has correctly received only a voice signal.

Further, there is assumed that the mobile station 4 can demodulate signals modulated through use of spread codes $C_1$ and $C_2$, respectively; that the base station 2 modulates valid information through use of the spread code $C_1$ and modulates invalid information through use of a spread code Cn, the result of which cannot be demodulated at the mobile station 4; and that the base station 3 modulates valid information through use of the spread code $C_2$ and modulates invalid information through use of a spread code Cn, the result of which cannot be demodulated at the mobile station 4.

As shown in FIG. 2, in each of the first and second stations 2 and 3, a control signal S and a voice signal V are composed in a fixed pattern in order to obtain a single traffic signal, and the traffic signal is then input to the spread-coding apparatus 10. For example, in the case of the input signal shown in FIG. 2, the control signal S and the voice signal V are alternately inserted in a time-series fashion. Also, each of the first and second stations 2 and 3 creates an input information signal indicating whether the control signals S and the voice signals V have been correctly received and inputs the input information signal to the spread-coding apparatus 10.

When the valid signal determination unit 13 of the spread-coding apparatus 10 receives the input information signal in the above-described state, the valid signal determination unit 13 determines whether each of the control signal S and the voice signal V is valid information, and outputs the result of the determination to the selection instruction unit 12.

At this time, in the first base station 2, the valid signal determination unit 13 determines that both the control signal S and the voice signal V are valid information. Therefore, the selection instruction unit 12 of the first base station 2 outputs a timing signal T as shown in FIG. 3(*c*) (always "H"). In accordance with the timing signal T, the selection unit 11 assigns a spread code $C_1$ to the control signal S and the voice signal V. At this time , the modulator 14 modulates the control signal S and the voice signal V through use of the spread code $C_1$.

Accordingly, the mobile station 4 can demodulate the control signal S and the voice signal V included in the down traffic signal transmitted from the first base station 2.

Meanwhile, in the second base station 3, the valid signal determination unit 13 determines that the voice signal V is valid information and the control signal S is invalid information. Therefore, the selection instruction unit 12 of the second base station 3 outputs, as shown in FIG. 3(*a*)., a timing signal T that becomes "H" at points in time corresponding to the voice signal V and becomes "L" at points in time corresponding to the control signal S. At this time, the selection unit 11 assigns a spread code $C_2$ to the voice signal V and a spread code Cn to t he control signal S. Also, the modulator 14 modulates the voice signal V through use of the spread code $C_2$ and modulates the control signal S through use of the spread code Cn.

Accordingly, the mobile station 4 demodulates only the voice signal V included in the down traffic signal transmitted from the second base station 3. Since the control signal S that has not been correctly received at the second base station 3 is modulated through use of the spread code Cn having no correlation with the spread codes $C_1$ and $C_2$, the control signal does not serve as noise having a strong correlation with the correctly received voice signal V. Therefore, only the correctly received signal can be reproduced through maximum ratio composition.

Also, when, among the signals transmitted from the base station controller 1, the first base station 2 has correctly received only the voice signal and the second base station has correctly received only the control signal, the first base station 2 modulates the voice signal through use of the spread code $C_1$ and modulates the control signal through use of the spread code Cn. Therefore, the mobile station 4 demodulates only the correctly received voice signal. Similarly, the second base station 3 modulates the control signal through use of the spread code $C_2$ and modulates the voice signal through use of the spread code Cn. Therefore, the mobile station 4 demodulates only the correctly received control signal.

Therefore, even when a base station correctly receives only one of the voice signal V and the control signal S transmitted from the base station controller 1, the mobile station 4 can utilize signals correctly received at the respective base stations and reproduces a signal.

Further, since a signal that-is not correctly received at the base station is not received by the mobile station 4 as noise having a strong correlation with a correctly received signal, the reproduction of a signal at the mobile station 4 is not prevented by the noise.

Moreover, the base station is only required to modulate a correctly received signal and an incorrectly received signal through use of different spread codes and then transmit them. Therefore, the base station is not required to perform complicated processing such as transmission on/off processing that is performed for a down-traffic signal including a voice signal V and a control signal S switched at short intervals such that only correctly received signals are transmitted at a predetermined power and incorrectly received signals are not transmitted. Therefore, the structure of the apparatus can be simplified.

Second Embodiment

Figure 4:
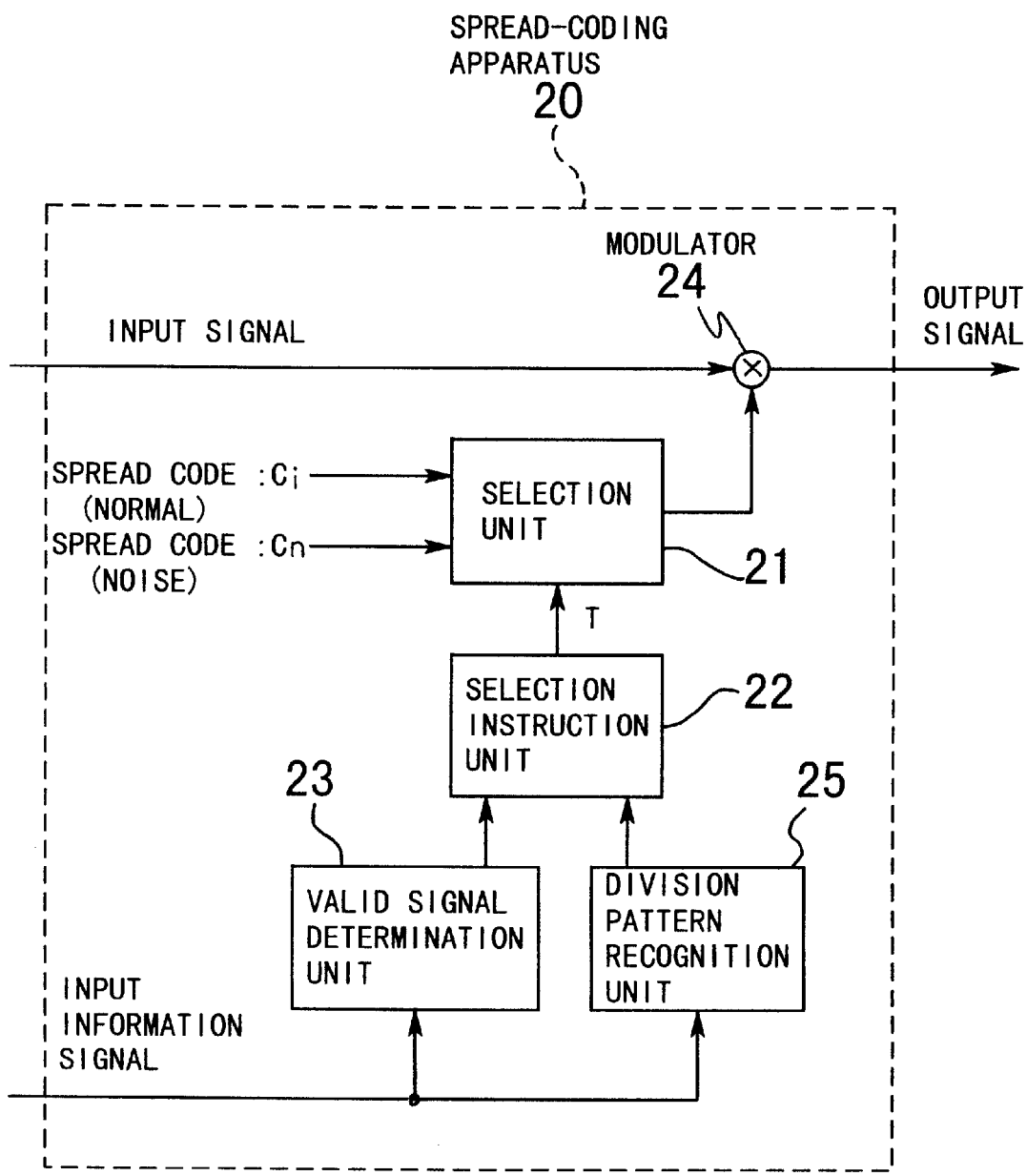
FIG. 4 shows the structure of a second embodiment of the down-traffic-signal transmission system according to the present invention, wherein a block diagram of a spread-coding apparatus provided in a base station is shown.
Figure 6A:
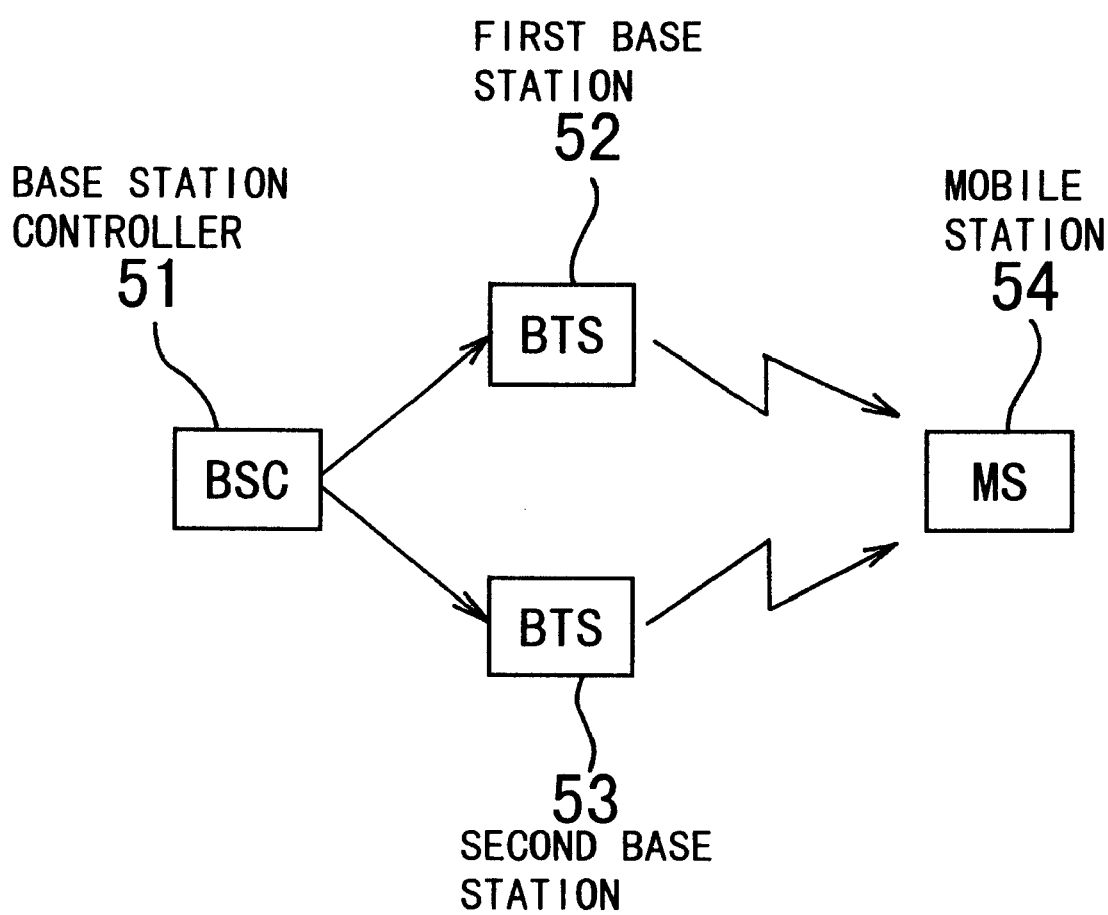
Figure 6B:
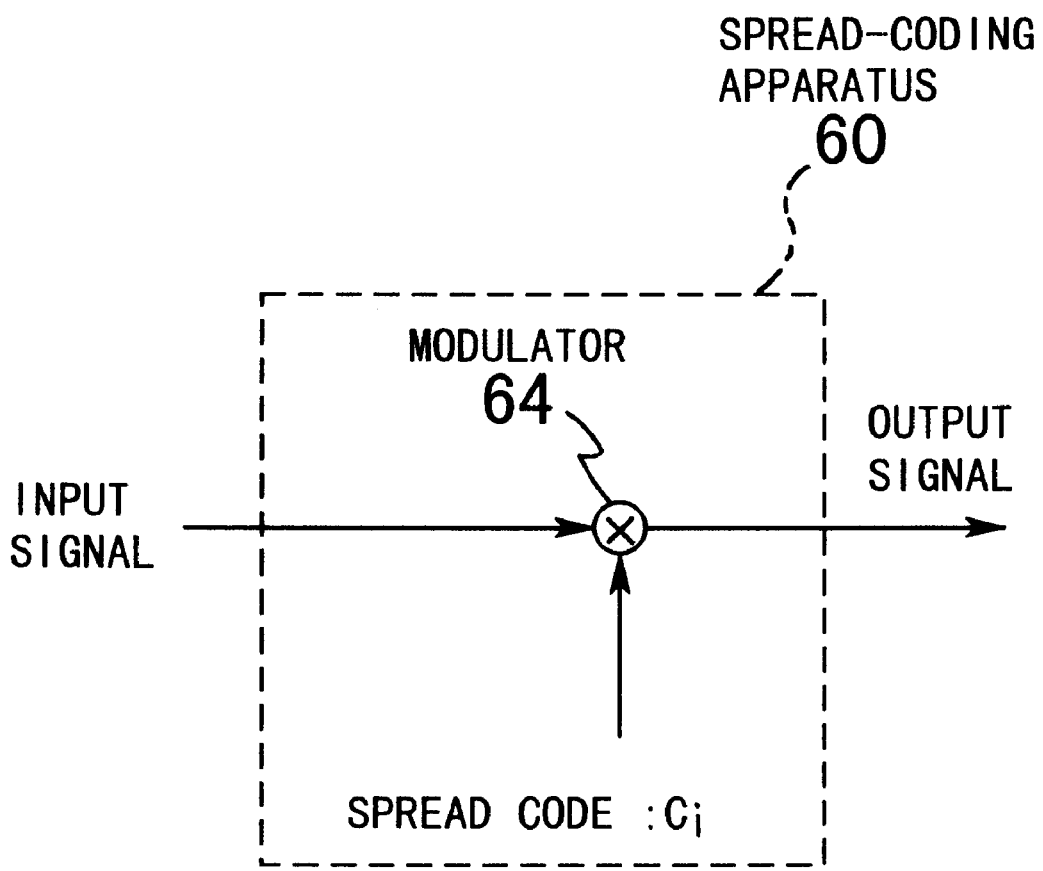

FIG. 4 shows the structure of a second embodiment of the down-traffic-signal transmission system according to the present invention, wherein a block diagram of a spread-coding apparatus provided in a base station is shown; and FIG. 5 a diagram showing a pattern of an input signal input to the spread-coding apparatus shown in FIG. 4.

The down-traffic signal transmission system of the present embodiment differs from the first embodiment in that a spread-coding apparatus 20 has a division pattern recognition unit 25 for recognizing the format pattern of the input signal formed by the control signal and the voice signal. The remaining portion has the same structure as that of the first embodiment, and therefore, a description thereof will be omitted.

In the present embodiment having the above-described structure, each the first and second base stations does not compose received control signals S and voice signals V in a fixed pattern but in a pattern that is arbitrarily determined for each traffic signal. For example, in the case shown in FIG. 5, the sequence is control signal S, voice signal V, control signal S, voice signal V, voice signal V, and voice signal V. This pattern is controlled at the base station controller such that all base stations that communicate with a mobile station use the same pattern.

In the spread-coding apparatus 20, an input information signal is received by the valid signal determination unit 23 and the division pattern recognition unit 25. The valid signal determination unit 23 determines whether each of the control signal S and the voice signal V in the input signal is valid information, and outputs the result of the determination to a selection instruction unit 22. The division pattern recognition unit 25 recognizes the format pattern of the control signal S and the voice signal V contained in the input signal and outputs the result of the recognition to the selection instruction unit 22.

The selection instruction unit 22 outputs a timing signal T to a selection unit 21 in accordance with the format pattern that the division pattern recognition unit 25 has recognized.

According to the timing signal T, the selection unit 21 assigns the spread code Ci to the control signal S and/or the voice signal V that are/is valid information in the input signal and assigns the spread code Cn to the control signal S and/or the voice signal V that are/is invalid information.

The modulator 24 modulates the control signal S and the voice signal V through use of spread codes assigned by means of the selection unit 21.

Therefore, in addition to the advantages of the first embodiment, the down-traffic signal transmission system of gee the present embodiment has the advantage that even when the amount of the control signal S completely differs from that of the voice signal V, both the signals can be effectively used at the mobile station. Especially, even when the down traffic signal is composed of only the voice signal or the control signal, these signals can be effectively used at the mobile station.

What is claimed is:

1. A down-traffic-signal transmission system for a mobile communication system comprising:

a plurality of base stations;

a mobile station capable of being connected with at least one base station via radio means; and a base station controller provided for connecting a mobile communication exchange and said base stations and for controlling said base stations, wherein communication between said base stations and said mobile station is performed in accordance with the CDMA scheme, said down-traffic-signal transmission system being designed such that each of said base stations has a spread-coding apparatus for modulating, through use of a different spread code, a traffic signal obtained through composition of a voice signal and a control signal separately received from said base station controller, and the thus-modulated traffic signal is transmitted from said base station to said mobile station, wherein said spread-coding apparatus comprises:

a valid signal determination unit for determining, as valid information, a control signal and/or a voice signal contained in a traffic signal from said base station controller when correctly received, and determining, as invalid information, the control signal and/or the voice signal when incorrectly received;

a selection instruction unit for outputting a timing signal based on results of the determination of said valid signal determination unit, the timing signal indicating that the control signal is valid or invalid information and that the voice signal is valid or invalid information;

a selection unit which, in accordance with the timing signal, assigns to the control signal and/or the voice signal determined as valid information a spread code that can be demodulated in said mobile station, and assigns to the control signal and/or the voice signal determined as invalid information a spread code that cannot be demodulated in said mobile station; and a modulator for modulating the control signal and the voice signal through use of the spread code assigned by means of said selection unit.

2. A down-traffic signal transmission system according to claim 1, wherein said spread-coding apparatus has a division pattern recognition unit for recognizing the format pattern of the traffic signal formed by said control signal and the voice signal; and said selection instruction unit outputs a timing signal based on the result of determination of said valid signal determination unit in accordance with the format pattern recognized by said division pattern recognition unit.

* * * * *